(12) United States Patent
Yoshitomi

(10) Patent No.: US 10,147,006 B2
(45) Date of Patent: Dec. 4, 2018

(54) DRIVE SUPPORT SYSTEM

(71) Applicant: DENSO CORPORATION, Kariya (JP)

(72) Inventor: Naoto Yoshitomi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 38 days.

(21) Appl. No.: 15/365,027

(22) Filed: Nov. 30, 2016

(65) Prior Publication Data

US 2017/0154229 A1    Jun. 1, 2017

(30) Foreign Application Priority Data

Dec. 1, 2015   (JP) .................................. 2015-234987

(51) Int. Cl.
  *G06K 9/00* (2006.01)
  *B60Q 9/00* (2006.01)
  *G08G 1/0962* (2006.01)

(52) U.S. Cl.
  CPC .......... *G06K 9/00818* (2013.01); *B60Q 9/00* (2013.01); *G06K 9/00798* (2013.01); *G08G 1/09623* (2013.01)

(58) Field of Classification Search
  USPC ....................................................... 382/103
  See application file for complete search history.

(56) References Cited

U.S. PATENT DOCUMENTS

| 2009/0202107 | A1* | 8/2009 | Wilson | G06K 9/00818 382/103 |
| 2016/0104049 | A1* | 4/2016 | Stenneth | G06K 9/72 382/155 |
| 2016/0137127 | A1* | 5/2016 | Yokochi | G06K 9/00798 348/148 |
| 2017/0103652 | A1* | 4/2017 | Yoshitomi | B60W 30/18154 |
| 2017/0166122 | A1* | 6/2017 | Ando | B60Q 9/00 |
| 2017/0236414 | A1* | 8/2017 | Nishimura | G06K 9/00818 382/104 |
| 2017/0363430 | A1* | 12/2017 | Al-Dahle | G01C 21/32 |
| 2017/0372176 | A1* | 12/2017 | Hibino | G06K 9/00798 |
| 2018/0003512 | A1* | 1/2018 | Lynch | G05D 1/0274 |
| 2018/0009367 | A1* | 1/2018 | Lee | B60Q 1/06 |
| 2018/0018875 | A1* | 1/2018 | Zhang | G08G 1/163 |
| 2018/0039270 | A1* | 2/2018 | Satake | G05D 1/0088 |

FOREIGN PATENT DOCUMENTS

| JP | 2005-025497 | 1/2005 |
| JP | 2014-099078 | 5/2014 |
| JP | 2014-099078 A | 5/2014 |

* cited by examiner

*Primary Examiner* — Jerome Grant, II
(74) *Attorney, Agent, or Firm* — Knobbe, Martens, Olson & Bear, LLP

(57) ABSTRACT

A drive support apparatus includes a sign recognition section that recognizes a kind and a position of a road sign present around an own vehicle based on image data of a captured image around the own vehicle, a notification section that issues notification of presence of the recognized road sign if the recognized road sign is a predetermined specified sign, and an inhibition section that inhibits the notifying section from making the notification on condition that the recognized sign is detected to be present at two or more positions on one side of a travelling road on which the own vehicle is travelling.

13 Claims, 3 Drawing Sheets

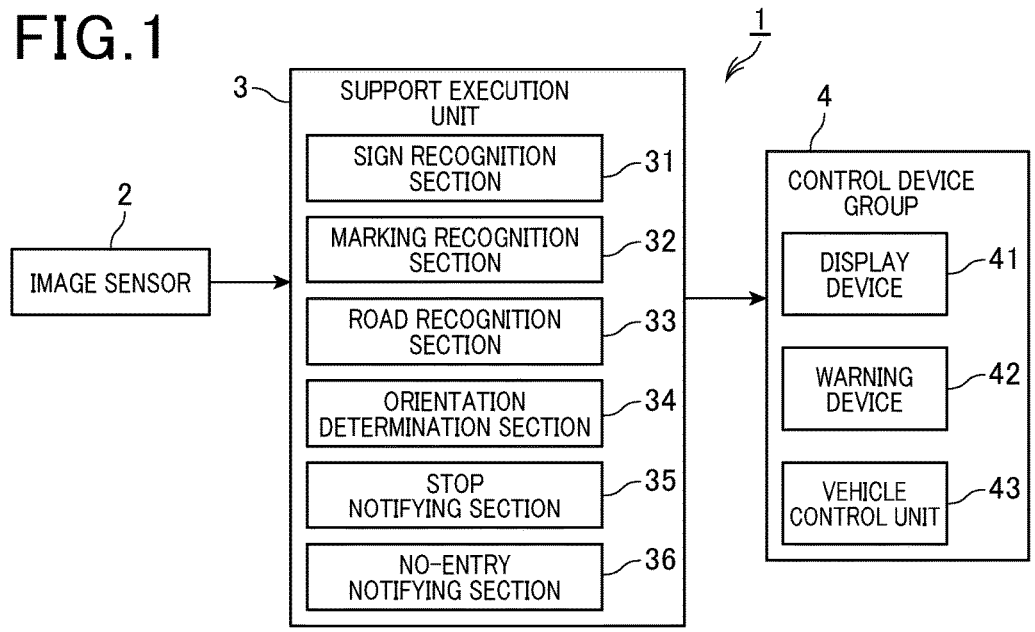
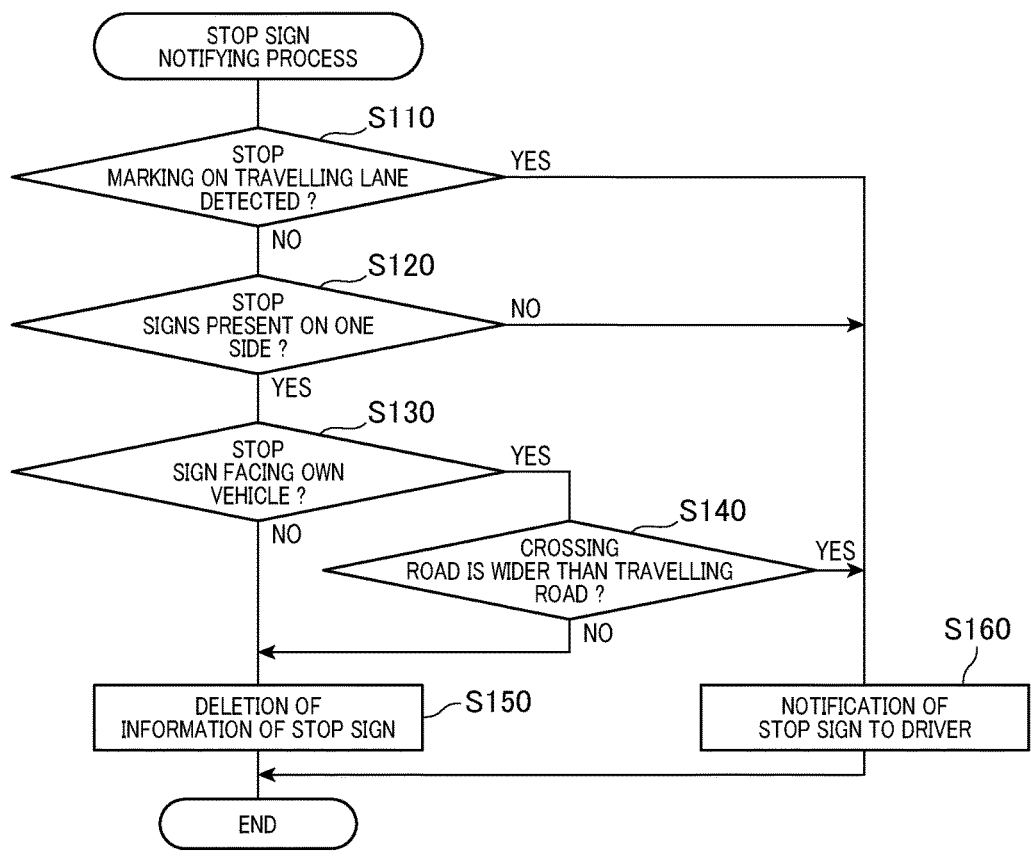

DRIVE SUPPORT SYSTEM

This application claims priority to Japanese Patent Application No. 2015-234987 filed on Dec. 1, 2015, the entire contents of which are hereby incorporated by reference.

BACKGROUND OF THE INVENTION

1. Field of the Invention

The present invention relates to a technique for supporting driving by a driver.

2. Description of Related Art

Japanese Patent Application Laid-open No. 2014-99078 describes an apparatus which notifies a driver of an own vehicle of a position at which the own vehicle should be stopped and so on based on recognition results of road signs by a camera. Not all recognized road signs have to be considered by the driver of the own vehicle. Accordingly, this apparatus is configured to determine whether or not recognized road signs are those installed for the road on which the own vehicle is travelling using map data and so on included in a navigation device.

However, this conventional apparatus cannot be used if the own vehicle is not provided with a navigation device including map data and so on, because it has to use data supplied from such a navigation device.

SUMMARY

An exemplary embodiment provides a drive support apparatus including:

a sign recognition section that recognizes a kind and a position of a road sign present around an own vehicle based on image data of a captured image around the own vehicle;

a notification section that issues a notification of presence of the recognized road sign if the recognized road sign is a predetermined specified sign; and an inhibition section that inhibits the notifying section from making the notification on condition that the recognized sign is detected to be present at two or more positions on one side of a travelling road on which the own vehicle is travelling.

According to the exemplary embodiment, there is provided a drive support apparatus that can support a driver in driving a vehicle in accordance with road signs even when the vehicle is not provided with a navigation device or the like.

Other advantages and features of the invention will become apparent from the following description including the drawings and claims.

BRIEF DESCRIPTION OF THE DRAWINGS

In the accompanying drawings:

FIG. 1 is a block diagram showing the overall structure of a drive support system according to an embodiment of the invention;

FIG. 2 is a flowchart showing steps of a stop sign notifying process performed by the drive support system;

PREFERRED EMBODIMENTS OF THE INVENTION

Figure 3:
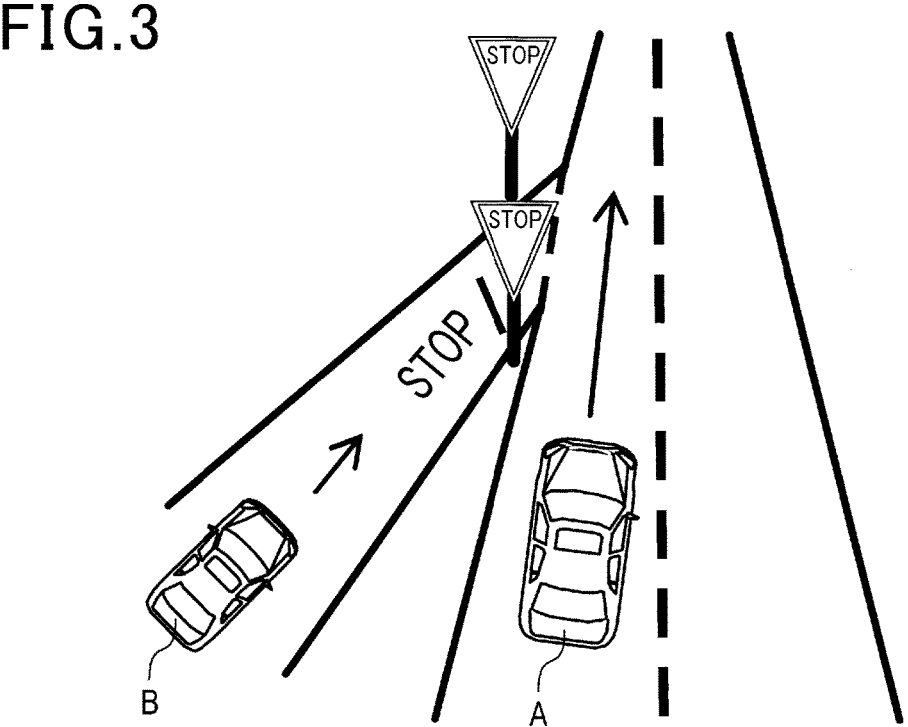
FIG. 3 is a diagram exemplifying an intersection in which stop signs are installed.

A drive support system 1 according to an embodiment of the invention is described with reference to the drawings. As shown in FIG. 1, the drive support system 1 which is mounted on an own vehicle includes an image sensor 2, a support execution unit 3 as a drive support apparatus and a control device group 4.

The image sensor 2 is comprised of a CCD camera, and configured to capture an image around (at least in front of) the own vehicle. The control device group 4 includes a display device 41, a warning device 42 and a vehicle control unit 43. The display device 41 includes a monitor for displaying various images. The warning device 42 includes a speaker for emitting a warning sound or a voice sound. The vehicle control unit 42 includes various devices for controlling an engine, a brake, a steering and so on.

The support execution unit 3 is a microcomputer based unit including at least one CPU, semiconductor memories as non-transient physical storage medium such as a RAM, a ROM and a flash memory. Various functions of the support execution unit 3 are implemented by the CPU executing programs stored in the non-transient physical storage medium.

The support execution unit 3 includes, as the functions implemented by the CPU executing programs, a sign recognition section 31, a marking recognition section 32, a road recognition section 33, an orientation determination section 34, a stop notifying section 35 and a no-entry notifying section 36. In this embodiment, the functions of the support execution unit 3 are provided by software. However, part or all of them may be provided by hardware such as logic circuits or analog circuits or combination of them.

The sign recognition section 31 processes an image captured by the image sensor 2 to recognize a road sign in the image. In this embodiment, the sign recognition section 31 recognizes at least a stop sign requiring stop immediately before an intersection and a no-entry sign prohibiting entry to a road on which this no-entry sign is installed.

In the following, these signs are referred to as specified signs.

The marking recognition section 32 processes an image captured by the image sensor 2 to recognize a road marking in the image. In this embodiment, the marking recognition section 32 recognizes at least a stop line specifying a position to stop at, and characters "STOP" instructing a stop. In the following, these road markings are referred to as the stop markings.

The road recognition section 33 processes an image captured by the image sensor 2 to recognize a road on which the own vehicle is travelling (referred to as the travelling road hereinafter), and a lane in which the own vehicle is travelling (referred to as the travelling lane hereinafter). Further, the road recognition section 33 obtains the road width of the travelling road, and the road width of a road crossing the travelling road at an intersection ahead of the own vehicle (referred to as the crossing road hereinafter), if any.

The orientation determination section 34 determines the orientation of a specified sign recognized by the sign recognition section 31. Specifically, the orientation determination section 34 extracts the contour of a recognized sign, and obtains the tilt angle of the sign with respect to the own vehicle based on the aspect ratio of the contour or the like. If the tilt angle is within a predetermined range, the orientation determination section 34 determines that the recognized specified sign is installed for the road on which the own vehicle is travelling.

The stop notifying section 35 and the no-entry notifying section 36 perform a stop sign notifying process and a no-entry sign notifying process in accordance with the recognition results or determination results in the sign recognition section 31, the marking recognition section 32, the road recognition section 33 and the orientation determination section 34.

Next, the stop sign notifying process performed by the stop notifying section 35 is explained with reference to the flowchart of FIG. 2. This process starts to be performed when a stop sign which is one of the specified signs has been recognized by the sign recognition section 31.

This process begins in step S110 where the temporary stop notifying section 35 determines whether a stop marking has been detected to be on the travelling lane based on the recognition results in the marking recognition section 32 and the road recognition section 33. If the determination result in step S110 is affirmative, the process proceeds to step S160, and otherwise proceeds to step S120.

In step S120, it is determined whether a temporary stop sign is present at a plurality of different positions on one side of the travelling road. If the determination result in step S120 is affirmative, the process proceeds to step S130. If the determination result in step S120 is negative, that is, if one stop sign is present on one side of the travelling road or one stop sign is present on both sides of the travelling road, the process proceeds to step S160.

In step S130, it is determined whether the orientation of the recognized stop sign faces the own vehicle in accordance with the determination result in the orientation determination section 34. If the determination result in step S130 is negative, the process proceeds to step S150 assuming that the stop sign is not a sign installed for the travelling road. If the determination result in step S130 is affirmative, the process proceeds to step S140.

In step S140, it is determined whether the road width of the crossing road is larger than the travelling road based on the recognition result in the road recognition section 33. As the determination result in step S140, the process proceeds to step S160 assuming that the travelling road is a non-priority road, and otherwise proceeds to step S150 assuming that the travelling road is a priority road.

In step S150, information about the recognized stop sign is deleted from the recognition result in the sign recognition section 31, and then the process is terminated. In step S160, the driver of the own vehicle is notified of the presence of the stop sign through the display device 41 or the warning device 42, and then the process is terminated.

In a situation as shown in FIG. 3, a stop marking is recognized for a vehicle B and the driver of the vehicle B is notified of the presence of the stop marking by the stop sign notifying process explained above. On the other hand, for a vehicle A, since a plurality of the stop signs are detected to be present on one side of the travelling road and their orientations do not face the vehicle A, notification of the presence of the stop signs is prohibited. In a case where the crossing angle between the travelling road and the crossing road is small, and the orientations of the stop signs are erroneously determined to face the vehicle A, the driver of the vehicle A is notified of the presence of the stop signs if the travelling road is determined to be a non-priority road.

Figure 4:
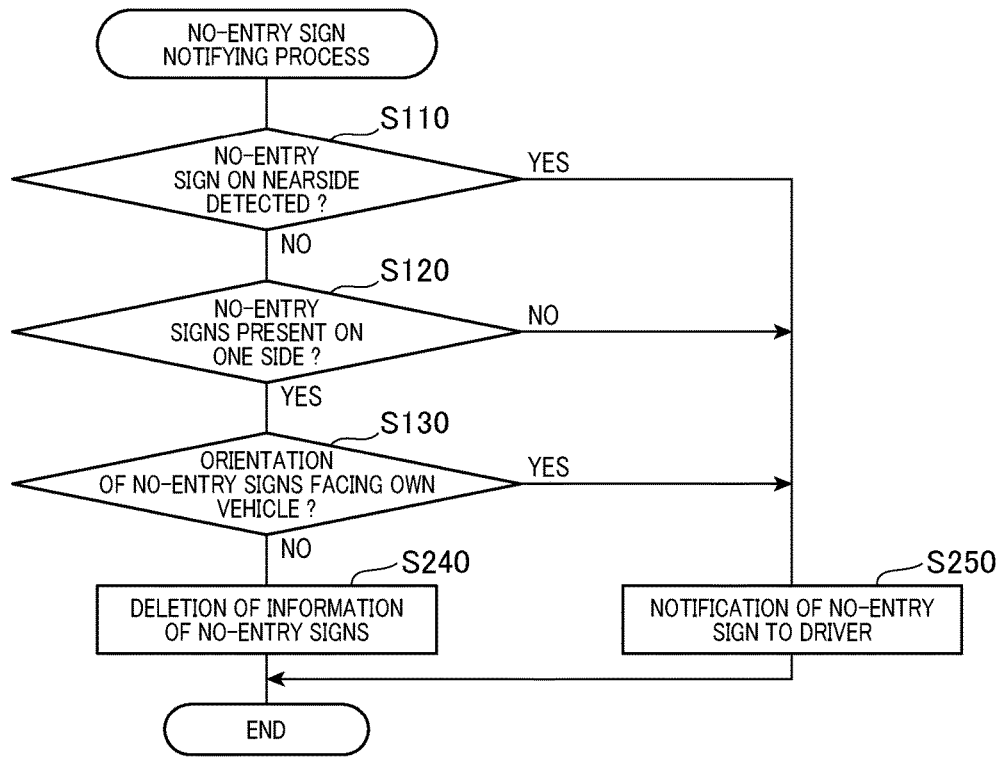
FIG. 4 is a flowchart showing steps of a no-entry sign notifying process performed by the drive support system.

Next, a no-entry sign notifying process performed by the no-entry notifying section 36 is explained with reference to the flowchart of FIG. 4. This process starts to be performed when a no-entry sign which is one of the specified signs has been recognized by the sign recognition section 31. In the following, a vehicle traffic zone including a lane in which the own vehicle is travelling is referred to as the own vehicle traffic zone. Further, the roadside of the travelling road on the side on which the own vehicle traffic zone is present is referred to as the nearside, and the roadside of the travelling road on the side on which the opposite lane is present is referred to as the farside. That is, for left-side traffic, the left side of the travelling road is the nearside and the right side is the farside. On the other hand, for right-side traffic, the right side of the travelling road is the nearside and the left side is the farside.

This process begins in step S210 where the no-entry notifying section 36 determines whether a no-entry sign has been detected to be present on the nearside of the travelling road based on the recognition results in the sign recognition section 31 and road recognition section 33. If the determination result in step S210 is affirmative, the process proceeds to step S250, and otherwise proceeds to step S220.

In step S220, it is determined whether no-entry signs are present at different positions on one side of the travelling road. If the determination result in step S220 is affirmative, the process proceeds to step S230. If the determination result in step S120 is negative, that is, if one no-entry sign is present on one side of the travelling road or one no-entry sign is present on both sides of the travelling road, the process proceeds to step S250.

In step S230, it is determined whether the orientation of the recognized no-entry sign faces the own vehicle in accordance with the determination result in the orientation determination section 34. If the determination result in step S230 is negative, the process proceeds to step S240 assuming that the recognized no-entry sign is not a sign installed for the travelling road. If the determination result in step S230 is affirmative, the process proceeds to step S250.

In step S240, information about the recognized no-entry sign is deleted from the recognition result in the sign recognition section 31, and then the process is terminated. In step S250, the driver of the own vehicle is notified of the presence of a no-entry sign through the display device 41 or the warning device 32, and then the process is terminated.

Figure 5:
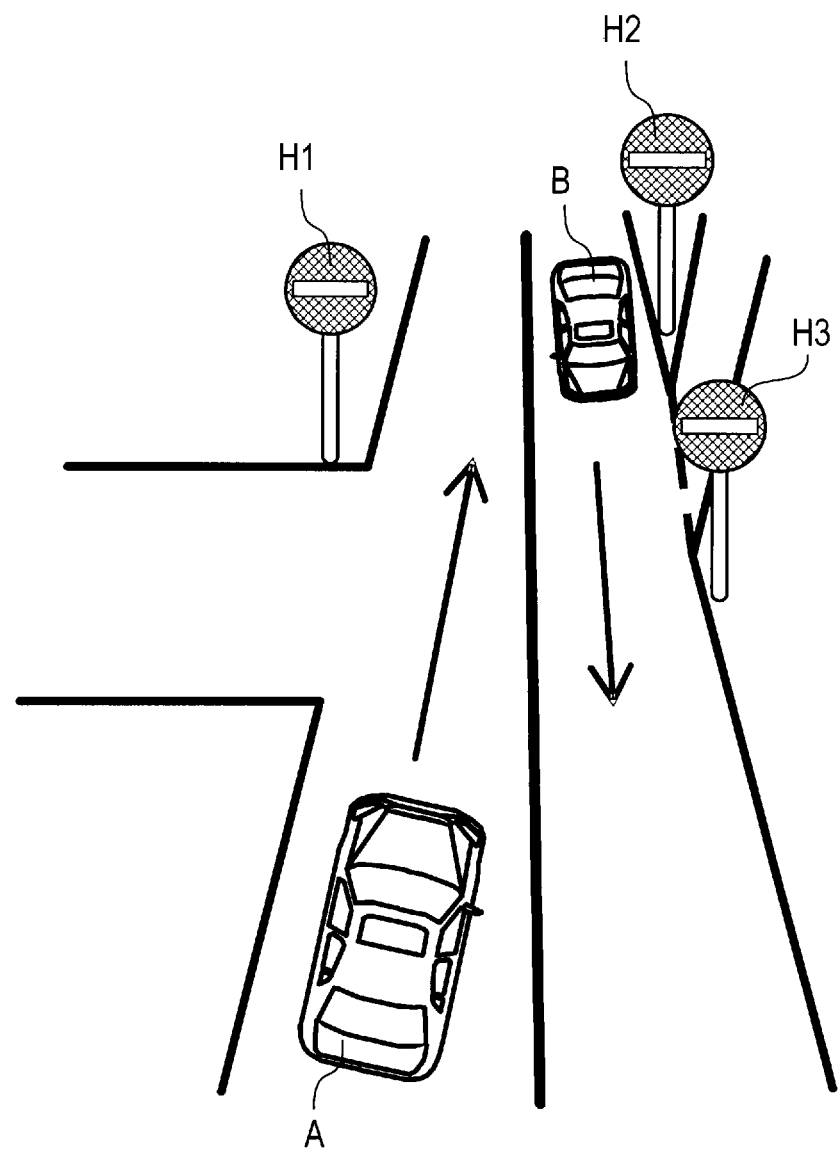
FIG. 5 is a diagram exemplifying an intersection in which no-entry signs are installed.

In a situation as shown in FIG. 5, for vehicle A, since a no-entry sign H1 is detected to be on the nearside, the driver of the vehicle A is notified of the presence of the no-entry sign H1 by the no-entry sign notifying process explained above. For no-entry signs H2 and H3, the driver of the vehicle A is notified of the presence of them only if the orientation of them faces the vehicle A, because the two no-entry signs are detected to be present on the farside. For vehicle B, since the no-entry signs H2 and H3 are present on the nearside, the driver of the vehicle B is notified of the presence of them. For the no-entry sign H1, since it is detected to be present at one place on the farside, the driver of the vehicle B is notified of the presence of it.

As described above, an inhibition section (corresponding to step S120 or S220) of the drive support system 1 inhibits notifying the driver of the presence of two or more recognized specified signs in a case where they are detected to be present at two or more places on one side of the travelling road assuming that they are road signs for a crossing road.

However, if the orientations of the recognized specified signs face the own vehicle, a release section (corresponding to steps S130 and S140, or S230) cancels the inhibition assuming that they are road signs for the travelling road. For example, when the recognized specified sign is a stop sign, the release section cancels the inhibition on condition that the orientation of the recognized specified sign has been determined to face the own vehicle, and the travelling road is determined to be a non-priority road based on the road widths of the travelling road and the crossing road. This is because, when the crossing angle between the travelling road and the crossing road is small, the orientation of the recognized specified sign may be erroneously determined to face the own vehicle.

Further, an inhibition invalidation section corresponding to step S120 or S120 invalidates the inhibition and allows notifying the driver of the presence of the specified sign when the recognized specified sign is a stop sign on condition that a road marking requiring a stop is present, or when the recognized specified sign is a no-entry sign on condition that a no-entry sign is present on the nearside.

The drive support system 1 described above provides the following advantages. The drive support system 1 determines whether a recognized specified sign is for the travelling road of the own vehicle based on information obtained from captured images, for example, based on the number, position or orientation of the recognized specified sign. Accordingly, even when the own vehicle is not provided with a navigation device or the like, it is possible to support the driver of the own vehicle by notifying the presence of a specified sign.

The drive support system 1 determines the necessity of making the notification by further determining whether a road marking is present and which of the travelling road and the crossing road is a priority road when the recognized specified sign is a stop sign, or by further determining whether the recognized specified sign is on the nearside or farside of the travelling road when it is a no-entry sign. The drive support system 1 is capable of accurately determining necessity of making the notification when a specified sign is recognized based on the installation mode of the recognized sign.

Other Embodiments

It is a matter of course that various modifications can be made to the above described embodiment as described below.

In the above embodiment, various recognitions and determinations are mad using information obtained from images captured by the image sensors 2. However, when the own vehicle is provided with a navigation device or a road-to-vehicle communication device, the various recognitions and determinations may be made using a combination of the information obtained from images captured by the image sensors 2 and information obtained from such a device.

In the above embodiment, the specified road signs include a stop sign and a no-entry sign. However it should be noted that any other road signs can be included in the specified road signs. In the above embodiment, to support driving of the driver, the presence of any of the specified road signs is notified to the driver. However, it should be noted that vehicle control such as acceleration, deceleration or steering of the own vehicle may be controlled depending on the contents of the recognized specified signs.

The above explained preferred embodiments are exemplary of the invention of the present application which is described solely by the claims appended below. It should be understood that modifications of the preferred embodiments may be made as would occur to one of skill in the art.

What is claimed is:

1. A drive support apparatus comprising:
a sign recognition section that recognizes a kind and a position of a road sign present around an own vehicle based on image data of a captured image around the own vehicle;
a notification section that issues notification of presence of the recognized road sign if the recognized road sign is a predetermined specified sign; and
an inhibition section that inhibits the notifying section from making the notification wherein, when two or more same kind road signs are simultaneously recognized by the sign recognition section to be present on one side of a travelling road on which the own vehicle is travelling, the inhibition section inhibits the notifying section from making the notification of presence of any of the two or more same kind road signs.

2. The drive support apparatus according to claim 1, further comprising an orientation determination section that determines orientation of the recognized sign, and a release section that cancels inhibition by the inhibition section on condition that the orientation of the recognized sign is determined to face the own vehicle.

3. The drive support apparatus according to claim 2, wherein the specified sign is a stop sign requiring stop immediately before an intersection.

4. The drive support apparatus according to claim 3, further comprising a marking recognition section that recognizes a marking on the travelling road based on the image data, and an inhibition invalidation section that invalidates the inhibition section on condition that a stop line or characters meaning a stop is recognized by the marking recognition section.

5. The drive support apparatus according to claim 3, further comprising a road recognition section that recognizes a crossing road intersecting the travelling road at an intersection ahead of the own vehicle based on the image data,
the release section being configured to cancel the inhibition by the inhibition section further on condition that a road width of the recognized crossing road is detected to be larger than a road width of the travelling road.

6. The drive support apparatus according to claim 2, wherein the specified sign is a no-entry sign prohibiting entry beyond the no-entry sign.

7. The drive support apparatus according to claim 6, wherein
a vehicle traffic zone including a lane in which the own vehicle is travelling is an own vehicle traffic zone, one roadside of the travelling road on which the own vehicle traffic zone is present being a nearside, and
the drive support apparatus further comprises an inhibition invalidation section that invalidates the inhibition by the inhibition section on condition that the recognized sign is detected to be present on the nearside of the travelling road.

8. A drive support apparatus comprising:
a sign recognition section that recognizes a kind and a position of a road sign present around an own vehicle based on image data of a captured image around the own vehicle;
a notification section that issues notification of presence of the recognized road sign if the recognized road sign is a predetermined specified sign;
an inhibition section that inhibits the notifying section from making the notification on condition that the recognized sign is detected to be present at two or more positions on one side of a travelling road on which the own vehicle is travelling; and an orientation determination section that determines orientation of the recognized sign, and a release section that cancels inhibition by the inhibition section on condition that the orientation of the recognized sign is determined to face the own vehicle.

9. The drive support apparatus according to claim 8, wherein the specified sign is a stop sign requiring stop immediately before an intersection.

10. The drive support apparatus according to claim 9, further comprising a marking recognition section that recognizes a marking on the travelling road based on the image data, and an inhibition invalidation section that invalidates the inhibition section on condition that a stop line or characters meaning a stop is recognized by the marking recognition section.

11. The drive support apparatus according to claim 9, further comprising a road recognition section that recognizes a crossing road intersecting the travelling road at an intersection ahead of the own vehicle based on the image data, the release section being configured to cancel the inhibition by the inhibition section further on condition that a road width of the recognized crossing road is detected to be larger than a road width of the travelling road.

12. The drive support apparatus according to claim 8, wherein the specified sign is a no-entry sign prohibiting entry beyond the no-entry sign.

13. The drive support apparatus according to claim 12, wherein a vehicle traffic zone including a lane in which the own vehicle is travelling is an own vehicle traffic zone, one roadside of the travelling road on which the own vehicle traffic zone is present being a nearside, and the drive support apparatus further comprises an inhibition invalidation section that invalidates the inhibition by the inhibition section on condition that the recognized sign is detected to be present on the nearside of the travelling road.

* * * * *